Figure 1:
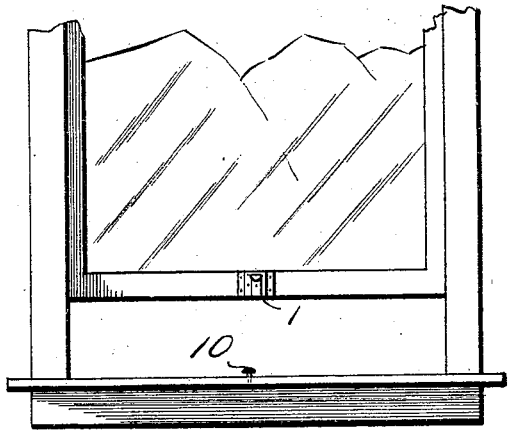

June 9, 1925. 1,541,447

E. VAN DER ZWALIN

COMBINED SASH AND LIFT LOCK

Filed March 3, 1924

Inventor
Edmond Van Der Zwalin

Witness

By
Attorney

Patented June 9, 1925.

1,541,447

UNITED STATES PATENT OFFICE.

EDMOND VAN DER ZWALIN, OF ST. CHARLES, ILLINOIS.

COMBINED SASH AND LIFT LOCK.

Application filed March 3, 1924. Serial No. 696,654.

*To all whom it may concern:*

Be it known that I, EDMOND VAN DER ZWALIN, a citizen of the United States, residing at St. Charles, in the county of Kane and State of Illinois, have invented certain new and useful Improvements in Combined Sash and Lift Locks, of which the following is a specification.

The present invention relates to sash lifts for window sashes, and it has for its particular object to provide a device which combines with the lift proper, a suitable locking means for securing the sash in its lowermost position, said locking means being adapted to be operated to release the sash whenever the latter is raised by means of said lift.

A further object of the invention is to provide a latch of this character, which due to its simple design and few parts may be economically constructed and although embodying a minimum amount of material and requiring but little labor and machine work, at the same time is capable of operating in a simple and quiet manner providing for the long and useful life of the several parts of which the latch is composed.

Another important object of the invention is to provide a bolt in the latch so arranged and mounted that when the same contacts with the keeper, the forces brought to bear upon the latch bolt will tend to prevent rattling or vibrating of the window and thus eliminating objectionable noises.

A still further important object of the invention is to provide a device of this nature capable of ready operation in a smooth and quiet manner and one which is otherwise well adapted to the purpose for which it is designed.

With the above and numerous other objects in view, the invention resides in certain novel features of construction, and in the combination and arrangement of parts as will be hereinafter more fully described and claimed.

Figure 2:
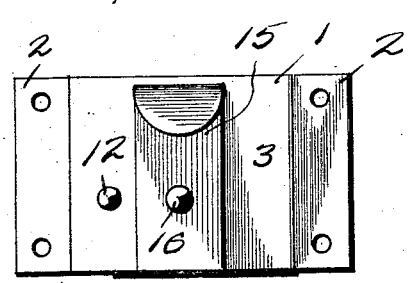
Figure 3:
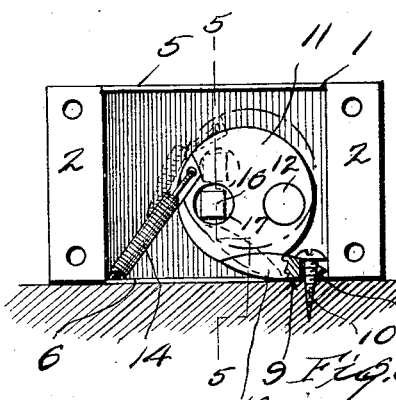
Figure 4:
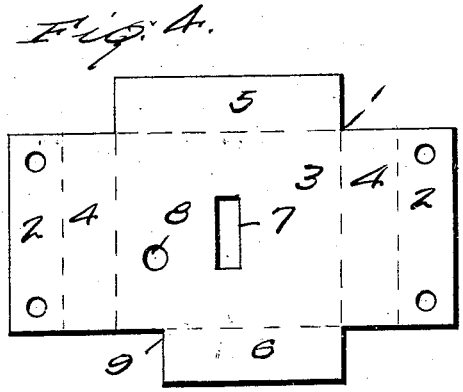
Figures 5, 6, 7:
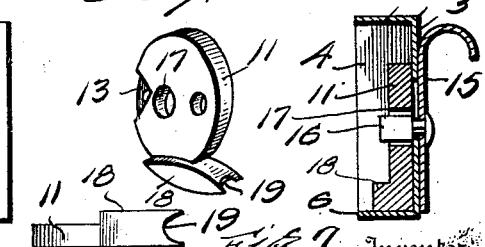

In the drawing:

Figure 1 is a fragmentary elevation of a window frame and sash associated therewith showing my combination sash lock and lift on the sash, Figure 2 is a front elevation of the device embodying my invention, Figure 3 is a rear elevation thereof, Figure 4 is a plan view of the blank from which the casing of the device is formed, Figure 5 is a vertical section taken substantially on the line 5—5 of Figure 3 looking to the right, Figure 6 is a detail perspective of the latch bolt and eccentric, and Figure 7 is an edge view thereof looking at its bottom.

In the drawings the numeral 1 designates generally a rectangular case which contains the locking mechanism hereinafter described and which is provided with suitable securing wings 2, that are perforated for the reception of screws or other means for retaining said case in position against the inner face of the bottom rail of a window sash, as shown in Figure 1. By referring to Figure 4 it will be seen that this casing is formed from a single sheet of metal or other suitable material and that this blank is bent to provide the front wall 3, the side walls 4, the top wall 5, the bottom wall 6, and the previously mentioned securing wings 2 extending from the side walls 4. The front wall 3 is provided with a vertical elongated slot 7 and an aperture to one side thereof indicated at 8. The bottom wall 6 is shorter than the adjacent side of the front wall 3 so as to provide an opening 9. The bottom rail of the window sash forms the rear wall of the case thereby simplifying and cheapening the construction. This case is preferably mounted centrally on the bottom rail of the sash and a keeper 10 is mounted on the sill of the window frame as shown in Figure 1 to be engaged by the mechanism within the casing as will be hereinafter described. This keeper in its simplest form is a screw but, of course, other similar devices will answer the purpose.

An eccentric 11 is mounted within the case 1 and is in the form of a substantially circular plate or disk having a pintle 12 adjacent its periphery which pierces the aperture 8 of the front wall and is headed as is indicated in Figure 2 so that the eccentric may be rotated into the positions indicated in Figure 3 by the full line structure and by the dotted line structure. A reduced apertured portion 13 is provided opposite to the pintle 12 so that a coil spring 14 may be engaged therewith, this coil spring being also engaged in one corner of the casing namely the bottom corner opposite from that forming the opening 9.

A lift 15 is disposed on the outside of the front wall 3 and the upper end thereof is hooked over upon itself to form a finger engaging member. This lift 15 is mounted on the casing by means provided with a bolt 16 penetrating the elongated rectangular shaped slot 7. As is indicated in Figure 3 this bolt is preferably square so that it will not rotate within the slot 7. This bolt extends beyond the inner face of the front wall 3 and penetrates an opening 17 provided in the eccentric plate 11, this opening 17 being off center as is evident from an inspection of Figure 3.

A latch bolt 18 is constructed so as to be substantially elliptical in side elevation that is so as to be thicker at its bit portion and at its ends. The ends of this bolt preferably taper to a comparatively sharp edge. One end of the bolt is secured to the eccentric plate 11 so that the bolt extends substantially tangential from the periphery of the eccentric. The free end of the bolt 18 is notched as is indicated at 19 for engagement with the keeper 10. The upper surface of this bolt engages the head of the keeper and the spring normally holds said bolt in engagement therewith, it being noted that there is a substantially wedging action of the bolt in engaging the keeper thereby preventing vibration or rattling of the sash to a considerable degree.

When it is desired to lift the window sash it is only necessary to raise upwardly upon the lift 15 by catching the finger in the finger engaging upper end thereof thereby sliding the bolt 16 in the slot 17 and turning the eccentric 11 thereby moving the bolt 18 from engagement with the keeper 10. When the sash is lowered the lower curved face of the bolt 18 will engage the upper rounded surface of the head of the screw or keeper 10 thereby causing it to move so as to rotate the eccentric against the tension of the spring 14 so that keeper may penetrate into the opening 9 and be engaged by the bolt as previously described. It is to be noted that the free end of the bolt 18 is normally held against one side wall of the case 1 because of the tension of spring 14 engaged with the eccentric or rotatable member 11.

It is thought that the construction and operation of my invention will now be clearly understood without any more detail description thereof. It is desired, however, to point out that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

1. In a device of the class described, a casing including a front wall having an elongated slot therein, a lift embodying a bolt penetrating said slot for movement therein, a disk eccentrically mounted within the casing, a bolt tangentially mounted on the periphery of said disk, said casing provided with an opening, a spring in said casing normally holding the disk so that said bolt is disposed over said opening, said first mentioned bolt piercing the disk so that upon movement said disk will be rotated for moving the bolt away from the opening.

2. In a device of the class described, a casing having its front wall provided with an elongated slot, a lift embodying a pin penetrating said slot being non-circular in cross section so as to prevent rotation on the lift, a disk eccentrically rotatable in the casing and provided with an eccentrically mounted opening for receiving the pin, a bolt substantially elliptical shape in side elevation and tangentially disposed on the disk and having one end notched, said casing provided with an opening, and a spring in the casing engaged at one end with the casing and at the other end with the disk so as to normally hold said bolt with its notched end over the opening in the casing.

In testimony whereof I affix my signature in presence of two witnesses.

EDMOND VAN DER ZWALIN.

Witnesses:
TILLIE MAY GROENINGS,
ANTONY BIESEK.